United States Patent [19]

Stuhr

[11] 4,265,115
[45] May 5, 1981

[54] AVERAGING TEMPERATURE RESPONSIVE APPARATUS

[75] Inventor: Leslie P. Stuhr, Minneapolis, Minn.

[73] Assignee: Honeywell Inc., Minneapolis, Minn.

[21] Appl. No.: 39,712

[22] Filed: May 17, 1979

[51] Int. Cl.³ .......................... G01K 1/16; G05D 23/24
[52] U.S. Cl. ........................................ 73/349; 62/227; 236/91 G
[58] Field of Search .................. 73/359, 349, 357; 29/515; 239/547; 138/42, 39, 37

[56] References Cited

U.S. PATENT DOCUMENTS

| 824,573 | 6/1906 | McKinne | 73/349 |
|---|---|---|---|
| 1,027,917 | 5/1912 | Smith | 29/163.5 R |
| 2,656,682 | 10/1953 | Wold | 29/515 X |
| 3,037,708 | 6/1962 | Schneider et al. | 239/547 X |
| 3,158,177 | 11/1964 | Schulz et al. | 138/37 X |
| 3,229,722 | 1/1966 | Kritzer | 138/39 |
| 3,620,081 | 11/1971 | Black | 73/349 |
| 3,631,687 | 1/1972 | Brooks et al. | 73/359 X |

FOREIGN PATENT DOCUMENTS 734702  8/1955  United Kingdom ...................... 73/349

OTHER PUBLICATIONS

Publ. Honeywell Publication of "Duct Sampling Chamber", Part No. 14002362-001, Rev. 1-77, No. 77-9835.

Primary Examiner—Daniel M. Yasich
Attorney, Agent, or Firm—Clyde C. Blinn

[57] ABSTRACT

An averaging temperature responsive apparatus for use in an air conditioning system to measure the average temperature of air passing through a duct has a tube extending transversely across the air duct. The tube has a series of spaced inlet openings on the upstream side and at least one exhaust opening on the downstream side. A temperature responsive element is mounted adjacent to the exhaust opening. Each of the inlet openings is made by cutting the tube and bending a portion of the tube inward so that upon air entering the inlet opening, the air is directed through the tube in a direction toward the exhaust opening.

5 Claims, 6 Drawing Figures

AVERAGING TEMPERATURE RESPONSIVE APPARATUS

BACKGROUND OF THE INVENTION

1. Field of the Invention

In air conditioning systems wherein air is delivered through ducts, there is often a need to measure the average temperature of the air passing through the duct. If a single temperature responsive element is used in one portion of the duct, the air stratification or mixing of the air is not always sufficient that the temperature with a single positioned temperature responsive element provides a true temperature of the total air passing through the duct.

2. Description of the Prior Art

Averaging temperature responsive apparatus for use in an air conditioning duct have had various forms. For many years a wire wound Balco temperature responsive resistance element where the wire is wound on a long support element which when inserted into the side of a duct would extend transversely across the duct to be impinged upon by the air flowing through the duct and thus provide an average temperature reading of the air. Such elements were not only expensive to manufacture but in many cases did not provide a true averaging temperature measurement.

Another form of averaging temperature responsive apparatus makes use of a tubular air conduit which is long enough to extend transversely across the duct. The conduit has either a continuous slit opening or a plurality of inlet openings on the upstream side and at least one opening on the downstream side. Positioned adjacent the downstream opening is a temperature responsive element so that as the air entering the upstream openings passes through the conduit and mixes, the temperature of the air as sensed by the temperature responsive element provides an average temperature of the air in the duct. Such prior art devices depend on pressure differential to promote air movement down the tube to the sensing element.

SUMMARY OF THE INVENTION

The present invention is concerned with an averaging temperature responsive apparatus which has improved performance over the prior art responsive apparatus. An elongated conduit or tubular duct is made to be adapted to be mounted transversely in an air duct. The tubular conduit has a plurality of inlet openings on the upstream side spaced across its length and at least one outlet opening on the downstream side. Adjacent the downstream opening is a temperature responsive sensing element to respond to the temperature of the air passing by the element. The upstream openings are formed by cutting the tubular duct at spaced positions and bending a portion of the duct inward to provide a sloping surface for diverting or redirecting the air flow, as it impinges upon the conduit, in a direction into the opening and along the conduit toward the exhaust opening. The redirecting of the air down the tubular duct sustains the air velocity near its original velocity and also promotes turbulence and better mixing of the air before it contacts the sensing element. With the sloped inlet surface for each of the openings, an improved sampling of the air takes place across the duct and thus the measurement of the average temperature is more accurate as the air moves by the temperature responsive element.

DESCRIPTION OF THE PREFERRED EMBODIMENT

Figure 1:
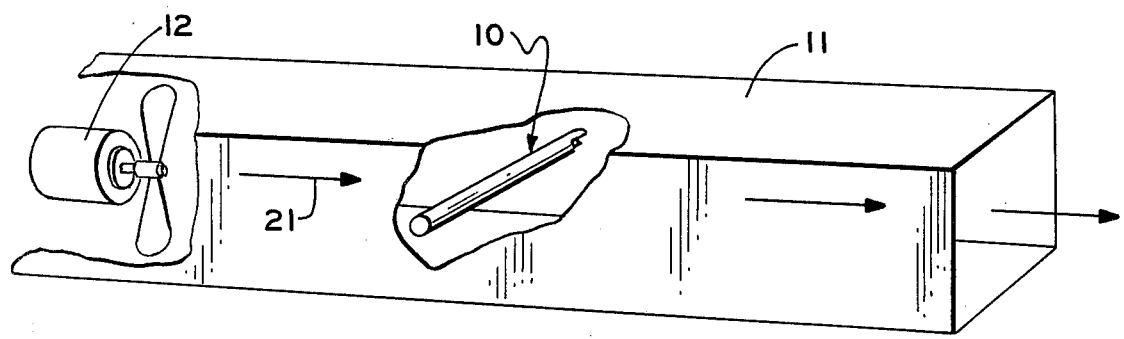
FIG. 1 is a schematic representation of an air duct with a fan for moving air through the duct to impinge upon the averaging temperature responsive apparatus.

Referring to FIG. 1, the improved averaging temperature responsive apparatus 10 is shown mounted in a duct 11 through which air flows under the power of a fan 12. The duct of FIG. 1 is a schematic showing and obviously could be any air conditioning duct where air moves through the duct under the power of some control fan apparatus.

Figure 2:
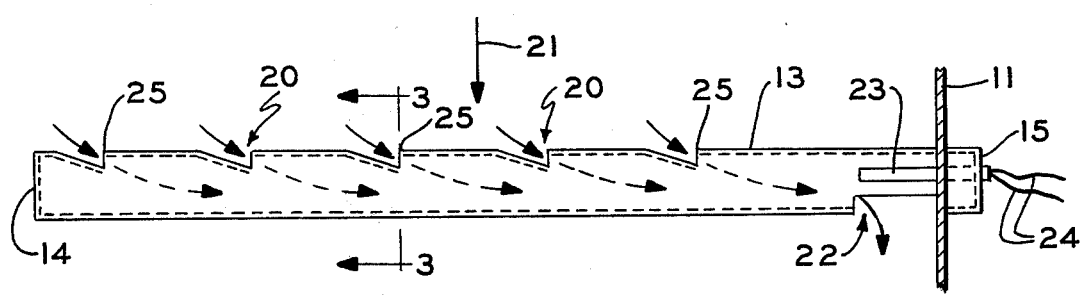
FIG. 2 is a cross-sectional view of the averaging temperature responsive apparatus showing the temperature responsive element and the inlet openings on the upstream side of the element.
Figure 3:
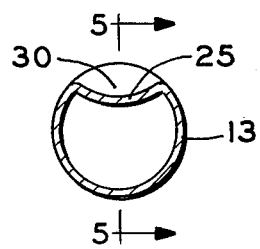
FIG. 3 is a cross-sectional view of the apparatus of FIG. 2 showing the vent portion of the conduit for inducing air flow into the conduit from the opening.

The averaging temperature responsive apparatus of FIG. 1 is shown in cross-sectional view in FIG. 2. A channel member or tubular conduit 13 is made sufficiently long to extend transversely across various sizes of air conditioning ducts such as shown in FIG. 1. Conduit 13 is closed at both ends 14 and 15. A plurality of inlet openings 20 on the upstream side of the conduit 13 are spaced along the length of the conduit to receive air passing as shown by the arrow 21. At least one outlet opening 22 on the downstream side of the conduit 13 provides for the exhausting of the air as it enters the plurality of inlet openings 20. Mounted adjacent the exhaust opening 22 is a temperature responsive element 23 which might be a temperature responsive resistance element or thermistor or any type of temperature measuring thermostat which would respond to the temperature of the air as it passes along the conduit 13 and exhausts from opening 22. Element 23 might be connected to an appropriate type of measuring or control apparatus over the wires 24. While opening 22 and element 23 are shown at one end near the end 15 which is mounted on duct 11, the opening 22 and element 23 might be placed at various positions along the conduit 13 to provide an exhausting of the air which enters the inlet opening 20.

Figure 4:
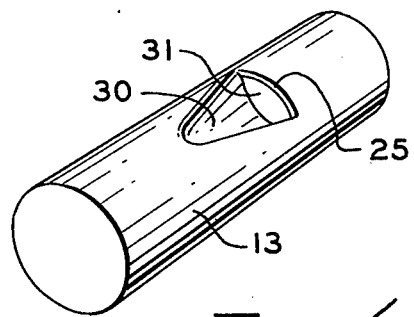
FIG. 4 is a perspective view of one of the openings of the apparatus of FIG. 2.
Figure 5:
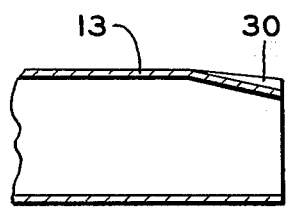
FIG. 5 is a cross-sectional view of the opening shown in the apparatus of FIG. 2.

Each of the inlet openings 20 is made by cutting the duct 13 at a plurality of locations 25 and bending the surface of the duct inward to provide an inclined or projection surface 30 to divert the air flow as it impinges upon the inclined surface 30 into the opening 31 as shown in FIGS. 4 and 5. A cross-sectional view of the inclined surface 30 is shown in FIG. 5. Surface 30 directs the incoming air down the duct toward element 23. The incoming air is maintained at its original velocity to assist in the temperature sensing operation. The inclined surface can be shaped to promote turbulence to mix the air in tube 13 to a better mixture and thus a more accurate averaging temperature measurement.

Figure 6:
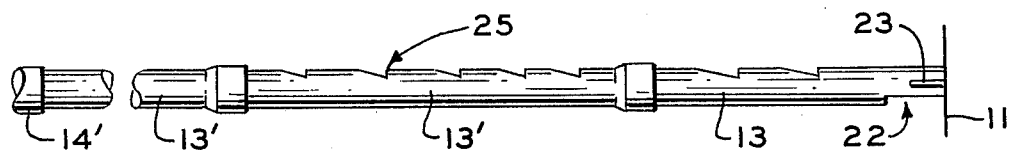
FIG. 6 is an elongated apparatus.

Duct 13 can be made of a plurality of sections as shown in FIG. 6. Each section is short enough to make a convenient shipping package for ease in marketing; however, many sections such as 13 and 13' can be coupled together with a cap 14' to enclose the end of section 13'. Often the average temperature across a six foot air duct is desired. If so, several sections of conduit can be connected together using conduit 13 with a sensing element 23, several sections of conduit 13 with a suitable connecting means and a cap 14'. The shape of openings 25 could be varied depending on the force needed to direct the air down duct 13' and 13.

OPERATION OF THE PREFERRED EMBODIMENT OF THE INVENTION

When the averaging temperature responsive apparatus 10 is placed in a duct with the openings 20 upstream to be impinged upon by the air moving through the duct, the air is redirected into the hole 31 by the sloped surface 30 and a vector of force to aid the air flow through the conduit 13 to the exhaust opening is present. With such a sloped or inclined surface 30 of each of the openings 20, a better sampling of air is provided across the duct to be provided for the averaging temperature measurement by element 23 as the mixed air is assisted to flow through the conduit 13 in a turbulent mixing manner to exhaust from the opening 22.

The embodiments of the invention in which an exclusive property or right is claimed are defined as follows:

1. In an averaging temperature responsive apparatus for use in air conditioning system to measure the average temperature of air passing through a duct comprising:
   a hollow channel member adapted to be mounted across a duct substantially at right angles to the direction of air flow through the duct, said hollow channel member being supported at one end on a wall of the duct and having its ends closed,
   a temperature responsive element mounted in one end of said channel member,
   said channel member having a plurality of holes spaced the length of said member on one side thereof,
   said channel member having an exhaust opening adjacent said temperature responsive element, said exhaust opening being on the opposite side of said member from said plurality of holes whereby a portion of the air passing through the duct flows into said plurality of holes, by said element, and out said exhaust opening to provide a sample of air across the duct and thus the average temperature of the air in the duct, and
   means comprising a portion of said channel member bent inward toward said one end of each of said plurality of holes for directing the flow of air as the air enters said one hole through said channel member toward said one end and said temperature responsive element.

2. In an averaging temperature responsive apparatus comprising,
   a hollow member adapted to be mounted across a duct perpendicular to the direction of air flow through the duct, said hollow member having closed ends and one end adapted to be mounted on a wall of a duct,
   a temperature responsive element mounted in said hollow member,
   said hollow member having a downstream opening adjacent said temperature responsive element,
   a plurality of inlet openings spaced across said hollow member on the upstream side thereof, each of said openings having a portion of said hollow member bent inward and sloping toward said downstream opening, thereby upon said air flowing toward said hollow member in the duct, a portion of the air enters each opening and is directed through said hollow member toward said downstream opening and thus toward said temperature responsive element by said inwardly bent portions.

3. In an averaging temperature responsive apparatus adapted for use in an air conditioning system for measuring the average temperature of air flowing through an air duct comprising:
   an elongated air conduit adapted for extending across a substantial portion of an air duct,
   means for sealing both ends of said conduit,
   a temperature responsive means mounted in said conduit,
   an air exhaust opening on the downstream side of said conduit adjacent said temperature responsive means,
   a plurality of air inlet openings on the upstream side of said conduit, said inlet openings are spaced along said conduit to receive inlet air from the air duct,
   each of said openings are formed with means to direct air flowing into said opening in a direction through said conduit toward said temperature responsive means and said exhaust opening, said means to direct comprises a bent portion of said conduit, said bent portion sloping inward and toward one end of said conduit.

4. The invention of claim 3 wherein;
   said means to direct air flowing into said opening comprises a cut in said conduit at right angles to its axis with a portion adjacent to said cut of said conduit bent inward and sloped toward said one end to provide an air diverting surface to direct air flowing into said opening formed at said cut toward one end thereof.

5. The invention of claim 3 wherein
   said conduit comprises a plurality of sections positively coupled together with open ends connected whereby the length of each section makes a convenient package size and when said sections are coupled together, said elongated air conduit is provided for extending transversely of a substantial portion of wide air ducts.

* * * * *

UNITED STATES PATENT OFFICE
CERTIFICATE OF CORRECTION

PATENT NO. : 4,265,115
DATED : May 5, 1981
INVENTOR(S) : Leslie P. Stuhr

It is certified that error appears in the above-identified patent and that said Letters Patent are hereby corrected as shown below:

In claim 1, line 58, delete "one hole" and substitute

--holes--.

Signed and Sealed this

Twenty-first Day of July 1981

[SEAL]

Attest:

Attesting Officer

GERALD J. MOSSINGHOFF

Commissioner of Patents and Trademarks